(12) United States Patent
Leclercq

(10) Patent No.: US 9,219,936 B2
(45) Date of Patent: *Dec. 22, 2015

(54) CONDITIONAL ACCESS INTEGRATION IN A SOC FOR MOBILE TV APPLICATIONS

(75) Inventor: Maxime Leclercq, Encinitas, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/021,178

(22) Filed: Feb. 4, 2011

(65) Prior Publication Data

US 2012/0036372 A1 Feb. 9, 2012

Related U.S. Application Data

(60) Provisional application No. 61/301,948, filed on Feb. 5, 2010.

(51) Int. Cl.
*G06F 11/30* (2006.01)
*H04L 29/06* (2006.01)
*H04N 21/418* (2011.01)

(52) U.S. Cl.
CPC ......... *H04N 21/418* (2013.01); *H04N 21/4181* (2013.01); *H04N 21/4183* (2013.01)

(58) Field of Classification Search
CPC .................................................. H04N 21/418
USPC .......... 713/192, 168, 169, 191, 190, 165, 166
See application file for complete search history.

(56) References Cited

U.S. PATENT DOCUMENTS

| | | | |
|---|---|---|---|
| 6,424,717 B1 | 7/2002 | Pinder et al. | |
| 6,882,729 B2 | 4/2005 | Arling et al. | |
| 7,409,570 B2 | 8/2008 | Suzuoki | |
| 7,469,837 B2* | 12/2008 | Mizushima | 235/492 |
| 7,506,358 B1 | 3/2009 | Fry et al. | |
| 8,050,085 B2* | 11/2011 | Takahashi et al. | 365/184 |
| 8,180,735 B2 | 5/2012 | Ansari et al. | |
| 8,258,809 B2* | 9/2012 | Choi et al. | 326/8 |
| 8,327,413 B2* | 12/2012 | Son | 725/131 |

(Continued)

OTHER PUBLICATIONS

International Search Report and Written Opinion corresponding to the PCT Application No. PCT/US2011/024543, date of mailing Apr. 6, 2011, 17 pages.
International Search Report and Written Opinion corresponding to the PCT Application No. PCT/US2011/030581, date of mailing May 25, 2011, 8 pages.

(Continued)

*Primary Examiner* — Abu Sholeman
(74) *Attorney, Agent, or Firm* — Kilpatrick Townsend & Stockton LLP

(57) ABSTRACT

An integrated circuit (IC) includes a demodulator for receiving encrypted information data and a hardware unit that enables conditional access to the information data. The hardware unit includes a processing unit, a RAM, a ROM, multiple non-volatile registers, and an interface unit for transferring an attribute to the demodulator. The non-volatile registers may include an IC identification and an encryption key. The ROM includes a boot code that causes the processing unit to fetch a code from an external memory and store the fetched code in the RAM. The fetched code may include a certificate that ensures the authenticity of the code. The fetched code may be encrypted and decrypted by the ROM using the IC identification and the encryption key. The demodulator includes a descrambler for decrypting the received information data using the attribute. The information data may include digital radio or television content.

21 Claims, 4 Drawing Sheets

(56) References Cited

U.S. PATENT DOCUMENTS

| | | | |
|---|---|---|---|
| 2003/0079138 A1 | 4/2003 | Nguyen et al. | |
| 2003/0135757 A1* | 7/2003 | Connor et al. | 713/201 |
| 2003/0163713 A1 | 8/2003 | Cocchi et al. | |
| 2004/0025010 A1 | 2/2004 | Azema et al. | |
| 2004/0039911 A1 | 2/2004 | Oka et al. | |
| 2004/0044906 A1 | 3/2004 | England et al. | |
| 2004/0181303 A1 | 9/2004 | Walmsley | |
| 2004/0210796 A1 | 10/2004 | Largman et al. | |
| 2005/0005138 A1 | 1/2005 | Awai | |
| 2005/0138397 A1 | 6/2005 | Kusudo et al. | |
| 2005/0246701 A1* | 11/2005 | Kanapathipillai et al. | 717/168 |
| 2005/0268086 A1* | 12/2005 | Kim | 713/2 |
| 2006/0015731 A1 | 1/2006 | Lakshmi Narayanan | |
| 2006/0117177 A1 | 6/2006 | Buer | |
| 2006/0149962 A1* | 7/2006 | Fountain et al. | 713/151 |
| 2006/0236113 A1 | 10/2006 | Uzawa | |
| 2006/0259743 A1 | 11/2006 | Suzuoki | |
| 2006/0272022 A1 | 11/2006 | Loukianov et al. | |
| 2007/0074045 A1 | 3/2007 | Van Essen et al. | |
| 2007/0124594 A1* | 5/2007 | Beuque | 713/181 |
| 2007/0136610 A1* | 6/2007 | Lambinet | 713/193 |
| 2007/0150734 A1* | 6/2007 | Gervais et al. | 713/170 |
| 2007/0180464 A1 | 8/2007 | Dellow et al. | |
| 2007/0192610 A1 | 8/2007 | Chun et al. | |
| 2007/0192625 A1* | 8/2007 | Carr | 713/189 |
| 2007/0277027 A1* | 11/2007 | Kim et al. | 713/1 |
| 2007/0294494 A1 | 12/2007 | Conti et al. | |
| 2008/0005586 A1 | 1/2008 | Munguia | |
| 2008/0016349 A1* | 1/2008 | Kahn | 713/168 |
| 2008/0101604 A1 | 5/2008 | Kocher et al. | |
| 2008/0183992 A1 | 7/2008 | Martin et al. | |
| 2008/0219494 A1 | 9/2008 | Chen | |
| 2008/0235406 A1 | 9/2008 | Meijer et al. | |
| 2008/0240230 A1 | 10/2008 | Oxman et al. | |
| 2008/0267410 A1 | 10/2008 | Dellow | |
| 2009/0044233 A1 | 2/2009 | Brandt et al. | |
| 2009/0049220 A1 | 2/2009 | Conti et al. | |
| 2009/0094501 A1* | 4/2009 | Jijina et al. | 714/752 |
| 2009/0094597 A1 | 4/2009 | Moskalik et al. | |
| 2009/0109487 A1 | 4/2009 | Tsukada | |
| 2009/0144557 A1 | 6/2009 | Sutton | |
| 2009/0316892 A1* | 12/2009 | Candelore | 380/210 |
| 2010/0005314 A1* | 1/2010 | Johnson et al. | 713/186 |
| 2010/0014671 A1* | 1/2010 | Moroney | 380/262 |
| 2010/0020963 A1* | 1/2010 | Candelore | 380/2 |
| 2010/0064125 A1* | 3/2010 | Liu et al. | 713/2 |
| 2010/0185808 A1* | 7/2010 | Yu et al. | 711/103 |
| 2010/0235624 A1* | 9/2010 | Candelore | 713/155 |
| 2010/0287620 A1* | 11/2010 | Fanton et al. | 726/27 |
| 2010/0293614 A1* | 11/2010 | Vilppola et al. | 726/22 |
| 2010/0328314 A1* | 12/2010 | Ellingham et al. | 345/440 |
| 2011/0055888 A1* | 3/2011 | Clardy et al. | 725/131 |
| 2011/0107076 A1* | 5/2011 | Kim et al. | 713/2 |
| 2011/0138192 A1 | 6/2011 | Kocher et al. | |
| 2011/0289124 A1* | 11/2011 | Denison | 707/812 |
| 2012/0042157 A1* | 2/2012 | Leclercq | 713/2 |
| 2012/0060039 A1* | 3/2012 | Leclercq | 713/189 |
| 2012/0072725 A1* | 3/2012 | Fanton et al. | 713/165 |
| 2012/0079261 A1 | 3/2012 | Leclercq | |
| 2012/0079279 A1 | 3/2012 | Leclercq | |
| 2012/0079287 A1 | 3/2012 | Leclercq | |
| 2012/0198224 A1 | 8/2012 | Leclercq | |
| 2014/0164753 A1* | 6/2014 | Lee | 713/2 |
| 2014/0237194 A1* | 8/2014 | Dusanapudi et al. | 711/141 |
| 2014/0337222 A1* | 11/2014 | Damola et al. | 705/44 |

OTHER PUBLICATIONS

International Search Report and Written Opinion corresponding to the PCT Application No. PCT/US2011/030378, date of mailing May 31, 2011, 13 pages.

International Search Report and Written Opinion corresponding to the PCT Application No. PCT/US2011/030033, dated of mailing Nov. 8, 2011, 14 pages.

International Search Report and Written Opinion corresponding to the PCT Application No. PCT/US2011/027299, dated of mailing Oct. 27, 2011, 14 pages.

International Search Report and Written Opinion corresponding to the PCT Application No. PCT/US2011/023749, date of mailing Apr. 6, 2011, 18 pages.

International Preliminary Report on Patentability for PCT Application No. PCT/US2011/030033, mailed on Oct. 11, 2012, 8 pages.

International Preliminary Report on Patentability for PCT Application No. PCT/US2011/030378, mailed on Oct. 11, 2012, 7 pages.

International Preliminary Report on Patentability for PCT Application No. PCT/US2011/030581, mailed on Oct. 11, 2012, 6 pages.

Non-Final Office Action for U.S. Appl. No. 13/072,069, mailed on Nov. 28, 2012, 22 pages.

Non-Final Office Action for U.S. Appl. No. 13/026,000, mailed on Dec. 26, 2012, 26 pages.

International Preliminary Report on Patentability for PCT Application No. PCT/US2011/027299, mailed on Sep. 20, 2012, 7 pages.

Leach et al. "A Universally Unique Identifier (UUID) URN Namespace", downloaded from http://www.ietf.org/rfe/rfe4122.txt, on Sep. 8, 2012, 30 pages.

Brusilovsky et al. "Password-Authenticated Diffie-Hellman Exchange (PAK)", downloaded from http://tools.ietf.org/html/draft-brusilovsky-pak-09, on Sep. 8, 2012, 13 pages.

Non-Final Office Action for U.S. Appl. No. 13/041,256, mailed on Sep. 14, 2012, 33 pages.

International Preliminary Report on Patentability for PCT Application No. PCT/US2011/024543, mailed on Aug. 23, 2012, 8 pages.

International Preliminary Report on Patentability for PCT Application No. PCT/US2011/023749, mailed on Aug. 16, 2012, 9 pages.

Final Office Action for U.S. Appl. No. 13/041,256, mailed on May 24, 2013, 37 pages.

Final Office Action for U.S. Appl. No. 13/072,069, mailed on Jul. 23, 2013, 20 pages.

Final Office Action for U.S. Appl. No. 13/026,000, mailed on Jul. 30, 2013, 24 pages.

Non-Final Office Action for U.S. Appl. No. 13/076,172, mailed on Nov. 7, 2013, 20 pages.

Non-Final Office Action for U.S. Appl. No. 13/075,038, mailed on Feb. 3, 2014, 23 pages.

Notice of Allowance for U.S. Appl. No. 13/205,578, mailed on Mar. 12, 2014, 17 pages.

Final Office Action for U.S. Appl. No. 13/026,000, mailed on Mar. 14, 2014, 22 pages.

Non Final Office Action for U.S. Appl. No. 13/041,256, mailed on May 7, 2014, 29 pages.

Notice of Allowance for U.S. Appl. No. 13/076,172, mailed on May 29, 2014, 7 pages.

Notice of Allowance for U.S. Appl. No. 13/205,578, mailed on Jul. 18, 2014, 8 pages.

Final Office Action for U.S. Appl. No. 13/075,038, mailed on Sep. 18, 2014, 19 pages.

Notice of Allowance for U.S. Appl. No. 13/076,172, mailed on Sep. 8, 2014, 8 pages.

* cited by examiner

CONDITIONAL ACCESS INTEGRATION IN A SOC FOR MOBILE TV APPLICATIONS

CROSS-REFERENCES TO RELATED APPLICATIONS

The present application claims benefit under 35 USC 119 (e) of U.S. provisional application No. 61/301,948, filed Feb. 5, 2010, entitled "Conditional Access Integration in a SOC for Mobile TV Applications," the content of which is incorporated herein by reference in its entirety.

BACKGROUND OF THE INVENTION

Embodiments of the present invention relate to digital broadcasts. More particularly, embodiments of the present invention relate to a device and system having conditional access to digital radio or digital television (TV) broadcasts.

There are several well-known digital radio and digital TV broadcast standards. In Europe, the digital radio broadcast is the DAB (Digital Audio Broadcasting) adopted by the ITU-R standardization body and by ETSI. The digital TV standard is DVB (Digital Video Broadcasting) in Europe, ATSC (Advanced Television Systems Committee) in the U.S., and ISDB (Integrated Services Digital Broadcasting) in Japan and South America. In addition to these standards, there are also mobile TV standards which relate to the reception of TV on handheld devices such as mobile phones or the like. Some well-known mobile TV standards are DVB-H (Digital Video Broadcasting-Handheld), CMMB (China), DMB (Digital Multimedia Broadcasting), and Mediaflo.

In most digital TV (DTV) broadcasting services, the service providers scramble and encrypt the transmitted data streams to protect the broadcasted content and require their customers or users to install "security protection" mechanisms to decrypt and descramble the content. Security protection mechanisms such as digital rights management enable users to store content. Conditional access systems are other security protection mechanisms that allow users to access and view content but may or may not record the viewed content.

In a typical pay-TV system, the conditional access software runs on a dedicated secure element implementing robust mechanisms so as to prevent a malicious entity ("hacker") from gaining access to the broadcast system secret to decipher the TV content. The CA instruction code and keys provisioned by the CA provider adapted to ensure security are typically stored in a non-volatile memory, such as an EEPROM or Flash, which are relatively expensive and require a specifically tuned CMOS process for fabrication.

FIG. 1 is a block diagram of a conventional TV receiver 100 performing conditional access (CA) functions. Receiver 100 includes a TV demodulator 110 coupled to a suitable antenna 105 for receiving broadcast content. Demodulator 110 is connected to a secure element 120. The connection can be a proprietary interface or a standard interface. Secure element 120 may be provided by the service provider and controls access to a broadcast service by descrambling a transmitted broadcast. Secure element 120 may also hold service entitlement information controlled by the service provider. The service provider may communicate with the secure element using encrypted messages that carry descrambling keys and other service management information. Secure element 120 descrambles encrypted data streams received from the TV demodulator and provides the descrambled data streams to a video and audio decoder 130. A display 140 coupled to the video and audio decoder displays the decoded video and audio data streams. In general, secure element 120 may be provided in several forms and in multiple packaging options. For example, the secure element may be a dedicated surface mount device mounted on the receiver, a SIM card, a secure SD card, or a module. The secure element typically includes a crypto processor, a secure CPU, read-only memory (ROM), and electrical erasable and programmable ROM (EEPROM) or Flash, as shown in FIG. 1.

FIG. 2 is a block diagram of a conventional secure element 200 showing components incorporated in the secure element 120 of FIG. 1. Secure element 200 includes a demodulator interface 210 that establishes a physical and electrical connection with the demodulator 110. Typically, the physical and electrical connection is a proprietary hardware interface that enables a user to plug the secure element to the TV demodulator. Secure element 200 also includes a secure CPU 220 that is configured to decrypt messages or data streams that are transmitted by the service providers. Secure element 200 further includes a plurality of hardware accelerators 230-1, 230-2, ..., 230n that assist the secure CPU for descrambling data streams and decode specific messages from the service provider. Secure element 200 additionally includes read-only memory 240 (ROM) and EEPROM/Flash 250. The ROM and EEPROM/Flash memory are programmed by the conditional access (CA) provider and contain CA firmware and decryption keys. When enabled by the user, CPU 220 executes program code stored in ROM and EEPROM/Flash memory and starts processing data streams received through the demodulator interface 210.

As shown in FIG. 1, the secure element 120 may include two physical interfaces, one for receiving encrypted data streams and the other one for sending decrypted data streams back to the demodulator. Other physical interfaces may exist for facilitating communication between the secure element and the demodulator.

It can be seen that the conventional secure element has a hardware architecture that is inflexible and adds costs to service providers. Furthermore, conventional techniques do not appear to address the concerns of service providers, CA operators, and content owners, specifically, at the point where content leaves the secure element.

BRIEF SUMMARY OF THE INVENTION

Embodiments of the present invention address the above problems. Embodiments of the present invention provide an integrated circuit that integrates functions required to achieve security (secure element) in a monolithic silicon device formed on the same substrate using a conventional CMOS process, e.g., a CMOS system-o-a-chip (SOC). In an embodiment, the integrated circuit includes a demodulator for receiving encrypted information data and a hardware unit that enables conditional access to the received information data. The hardware unit includes a processing unit, a random access memory (RAM), a read-only access memory (ROM), multiple non-volatile registers or fuses, and an interface unit configured to transfer an attribute to the demodulator. In an embodiment, the multiple non-volatile registers include an identification code of the integrated circuit and an encryption key. In an embodiment, the read-only memory includes a boot code that causes the processing unit to fetch a conditional access code from an external memory. In an embodiment, the fetched conditional access code is stored in the RAM disposed in the hardware unit. In an embodiment, the fetched conditional access code includes a certificate that is authenticated by the hardware unit using a secure algorithm residing in the ROM and based on the identification code stored in the multiple non-volatile registers or fuses. In an embodiment, the demodulator includes a descrambler circuit that descrambles the received information data using the attribute. In an embodiment, only the descrambler can receive the attribute which may be a secure bit pattern or a codeword for descrambling the received information data. In an embodiment, the integrated circuit is a monolithic silicon device fabricated using a conventional and widely available CMOS process, e.g., without the additional process steps required for making EEPROM or Flash.

Embodiments of the present invention also disclose a device for use in a conditional access system. The device includes a receiver module for receiving encrypted information data and a hardware unit that is coupled to the receiver module and grants conditional access to the received information data. In an embodiment, the hardware unit includes a processing unit, a random access memory, a read-only access memory, a plurality of non-volatile registers or fuses, and an interface unit, which transfers an attribute to the receiver module. In an embodiment, the receiver module and the hardware unit are integrated in a single CMOS chip. In an embodiment, the receiver module decrypts the received information data using the attribute which may be a secure bit pattern or a codeword. In an embodiment, the received information data includes digital radio or digital television content. In an embodiment, the device further includes a memory interface port configured to receive an external memory. In an embodiment, the external memory may be a Flash memory. In an embodiment, the device may include a crypto processor configured to provide tamper resistance to the device. In an embodiment, the read-only memory includes a boot code that causes the processing unit to fetch a conditional access code from the external memory and store the fetched conditional access code in the random access memory that is disposed in the hardware unit. In an embodiment, the fetched conditional access code may include a certificate and the processing unit may authenticate the conditional access code by regenerating its signature with a root public key and comparing the regenerated signature with a value disposed in the certificate. In an embodiment, the fetched conditional access code may be encrypted and decrypted by the processing unit using an encryption key stored in the plurality of non-volatile registers or fuses.

DETAILED DESCRIPTION OF THE INVENTION

Conditional access is used by TV broadcasters to generate revenue. To achieve this, security guidelines are used to protect the keys provisioned to the user and to guarantee that no hacker or malicious entity can crack the system and watch contents for free. These guidelines, also referred to as security requirements, define methods adapted to prevent misuse of the SOC (system-on-chip) device and its associated firmware, and furthermore to inhibit unauthorized access to secrets, such as keys, operating modes, etc. The SOC security framework described herein defines hardware (HW), software (SW), or a combination thereof to achieve these objectives.

Figure 1:
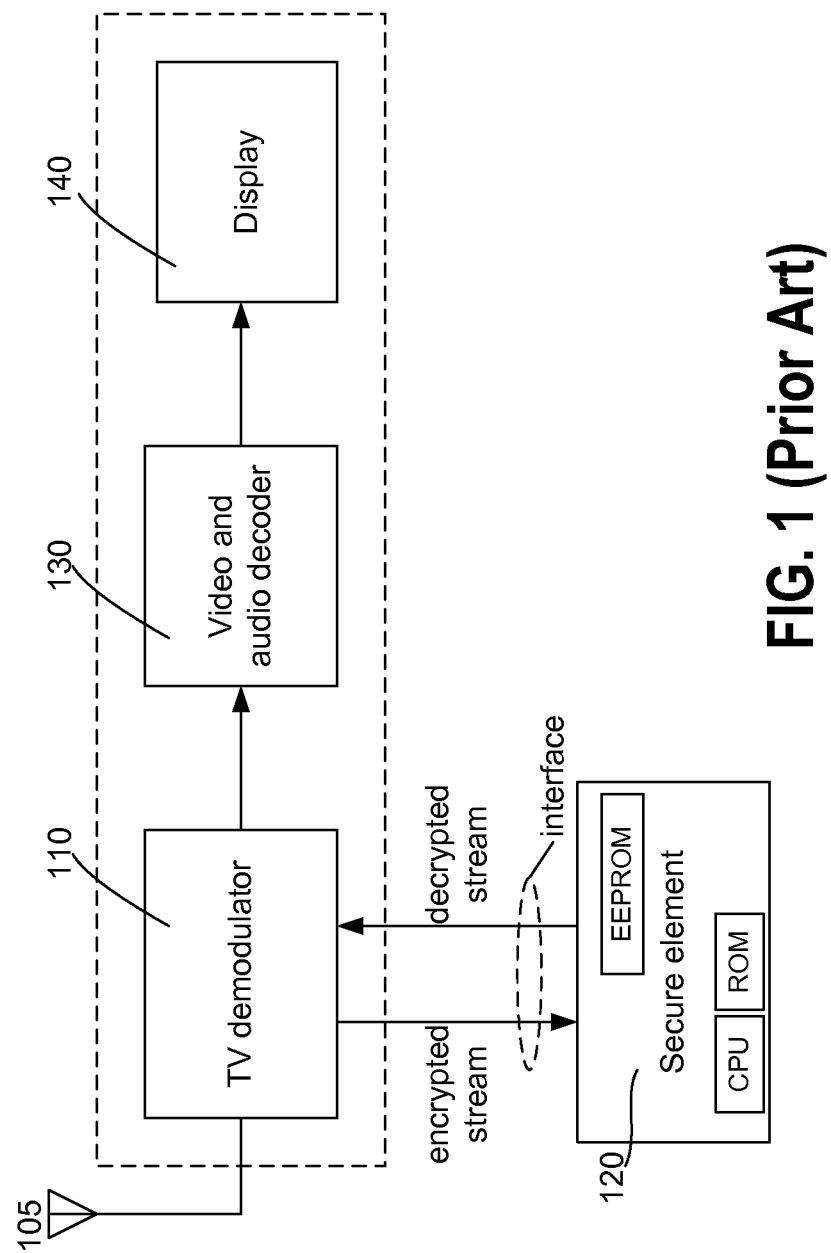
FIG. 1 is a block diagram of a conventional TV receiver 100 performing conditional access (CA) functions.
Figure 2:
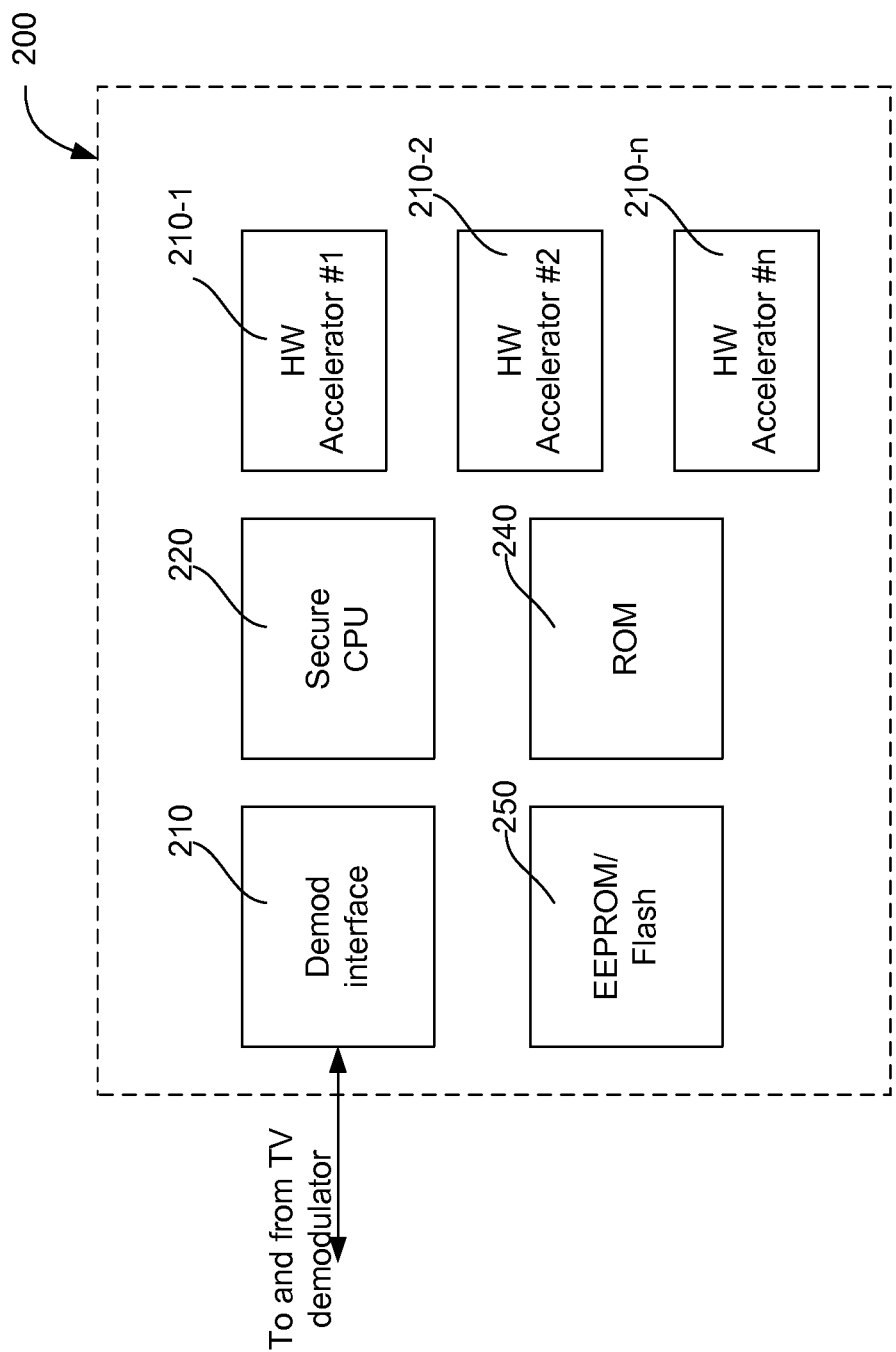
FIG. 2 is a block diagram of a conventional secure element 200 used in pay-TV applications.
Figure 3:
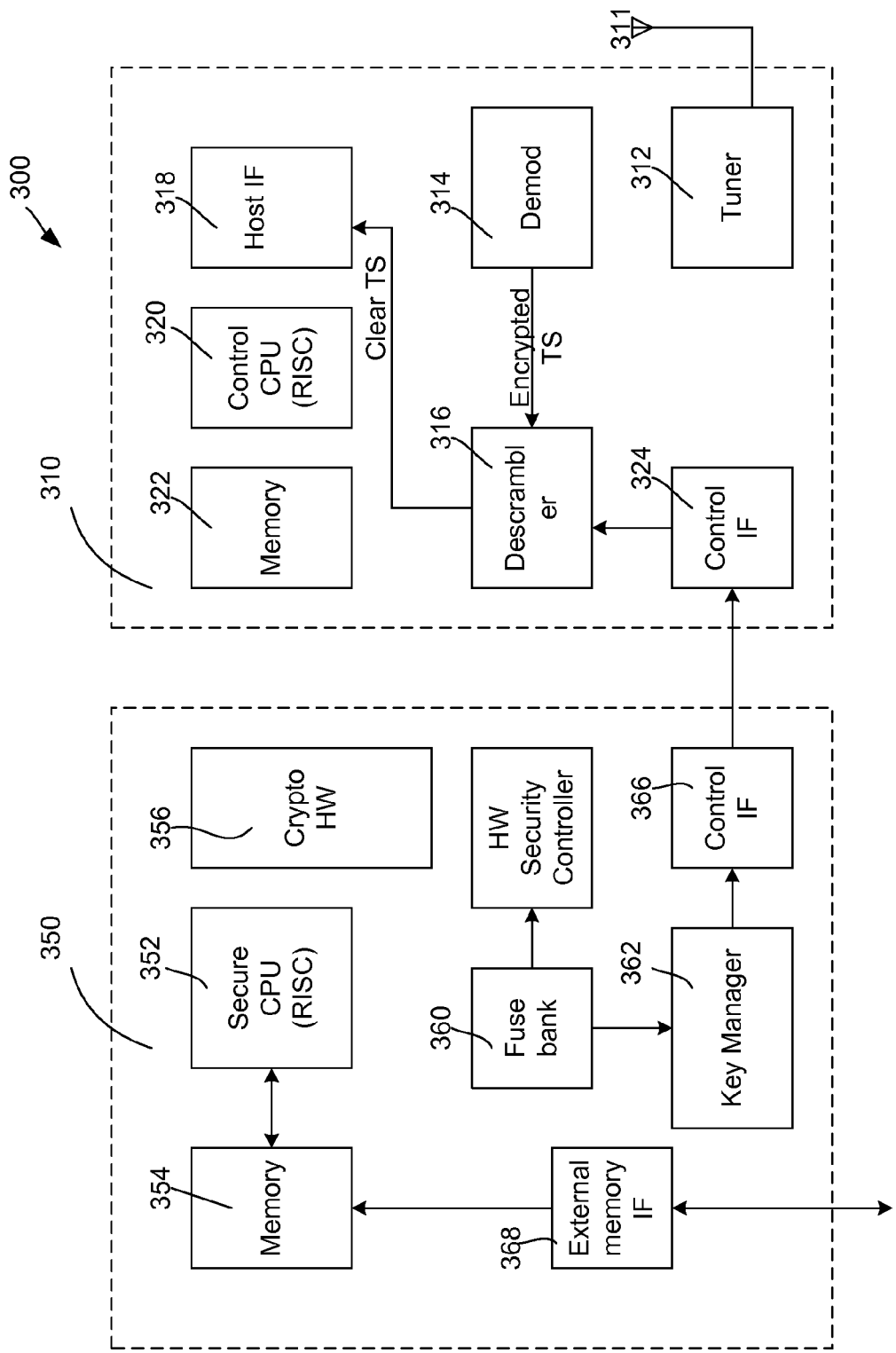
FIG. 3 is a simplified block diagram of an integrated conditional access sub-system in an SOC according to an embodiment of the present invention.

FIG. 3 is a simplified block diagram of a receiver system on a chip (SOC) 300 configured to perform tuning, demodulating, CA security, and the like, in accordance with an embodiment of the present invention. Receiver system 300 includes a digital broadcast receiver 310 that may be capable of receiving signals in a number of different frequency bands of interest and/or in a number of different formats. By way of example, receiver system 300 may be capable of receiving any one or more of the standards mentioned above or other suitable standards. In an exemplary embodiment, receiver system 300 also includes a conditional access security (CAS) sub-system 350.

Digital broadcast receiver 310 includes a tuner 312 that is connected to an antenna 311. Although an antenna is shown, tuner 312 may be connected to a number of antennas. The tuner is configured to frequency translate received signals and provide them to a demodulator 314 which demodulate the frequency translated signals into multiple data streams (audio, video, text, and others). Receiver 310 also includes a descrambler 316 that descrambles the data streams (indicated as encrypted TS) and provides clear (i.e., descrambled) data streams (indicated as clear TS in FIG. 3) to a host via a host interface unit 318. Receiver 310 further includes a control processor 320 and a memory unit 322 that contains software (program code) to enable a user to select a service and to program the tuner to a desired frequency. In an embodiment, the memory 322 may include dynamic random memory and/or permanent memory such as read-only memory (ROM).

Receiver 310 also includes a control interface unit 324 that connects the digital broadcast receiver 310 with the conditional access security sub-system 350. As described in section above, control access is a protection of content required by content owners or service providers. Conventional access approaches use dedicated surface mount device such as Smartcard, SIM card, secure SD card or the like. In conventional approaches, CA instruction code and keys provisioned by CA providers adapted to ensure security are typically stored in a non-volatile memory, such as an EEPROM or Flash, which are relatively expensive and cannot be easily and cost effectively integrated using standard CMOS fabrication processes. A novel conditional access security (CAS) sub-system according to an embodiment of the present invention will be described in detail below.

Referring to FIG. 3, CAS sub-system 350 includes a secure processor 352 coupled to a memory unit 354. The secure CPU may be a RISC CPU configured to process various processing operations. CAS sub-system 350 further includes a crypto hardware 356 that, in an embodiment, includes suitable crypto logic, circuitry (e.g., hardware) for performing cryptographic operations. In a specific embodiment, crypto hardware 356 may be a crypto processor configure to perform cryptographic functions such as processing digital signature, key management, identifying public keys and others due to the secure access requirements. During the manufacturing process, cryptographic hardware may generate a unique crypto ID (identity) for the receiver SOC 300 and a unique encryption key. CAS sub-system also includes a fuse bank 360. In an embodiment, fuse bank 360 may include electrically programmable fuses on the chip. In an embodiment, the fuse bank may contain an array of electrically programmable registers, each having a number of bits. The bits can be programmed during the manufacturing process or later by the service provider as the device is shipped to the user. In an embodiment, corresponding bits of the fuse bank are burned or blown according to the value of the unique device ID and a certificate key. In a specific embodiment, memory unit 354 includes random access memory and read-only memory. In contrast to conventional techniques, memory unit 354 does not includes EEPROM and/or Flash memory to facilitate the integration process and to minimize cost by using conventional (i.e., standard) CMOS process.

In an embodiment, the receiver SOC 300 includes an external memory interface 368 configured to interface with an external memory. Although the external memory interface 368 is shown to be located in the CAS sub-system 350, it can be located in any part of the receiver SOC as further disclosed below. In an embodiment, the external memory interface 368 can include a SD memory card slot, a multimedia card (MMC), a micro SD card slot, a mini SDHC, a microSDHC, a Memory Stick slot, a PCMCIA interface, and others. The external memory can be a commercial off-the-shelf Flash memory. In accordance with embodiments of the present invention, the conditional access (CA) software code is stored in a random access memory (RAM). The CA software is dynamically downloaded from an external non-volatile flash memory via the external memory interface 368 to the RAM during the power cycle of the security sub-system. However, because the external flash storing the CA software is outside the security perimeter it must first be authenticated and checked for any malicious alteration (such as bypass of the security function that could be inserted by a hacker). The secure sub-system implements a protocol to authenticate the firmware using a public key algorithm and digital certificate provisioned during manufacturing.

Figure 4:
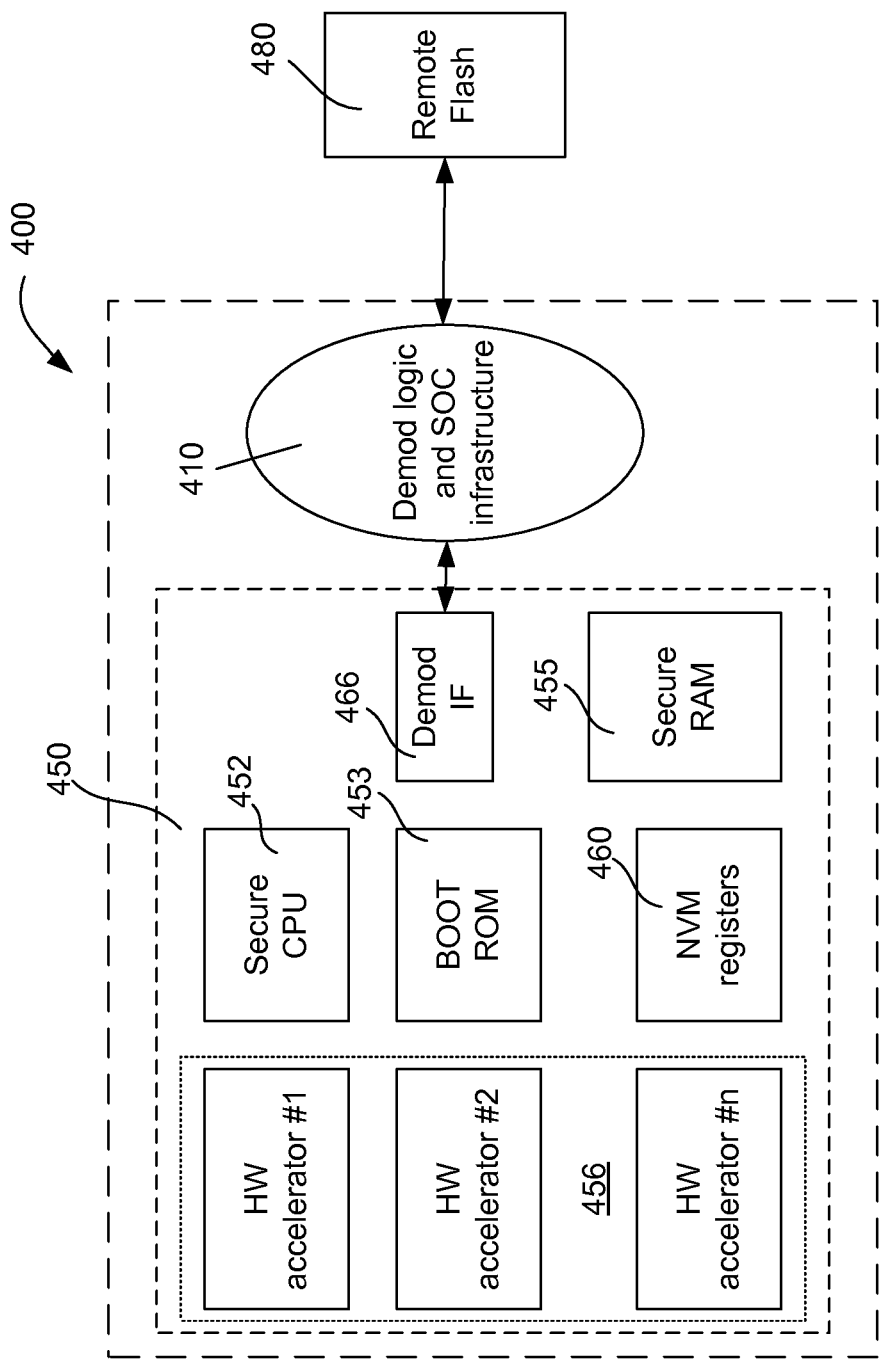
FIG. 4 is a block diagram of an integrated secure element integrated in a demodulator according to an embodiment of the present invention.

FIG. 4 is a block diagram of a demodulator SOC 400 including a demodulation logic 410 and an integrated secure element 450 according to an embodiment of the present invention. Demodulation logic 410 may have a similar configuration of the receiver 310 shown in FIG. 3. For example, demodulation logic 410 may include a tuner, a demodulator, a descrambler, a control CPU, a memory unit that comprises RAM and/or ROM, a host interface, and a control interface unit; the functions of those elements have been described in details in the sections above and won't be repeated herein for brevity. The demodulator logic 410 further includes system-on-a chip infrastructure such as registers, IO ports, external memory interface port, which is also similar to the external memory interface port 368 shown in FIG. 3 and described above. In an embodiment, a remote or external Flash memory 480 may be coupled to the demodulator SOC 400 through the demodulator logic 410. In another embodiment, the remote Flash memory may be coupled to the demodulator SOC 400 through a memory port disposed in the integrated secure element 450 (not shown).

In an embodiment, integrated secure element 450 includes a secure CPU 452, a boot read-only memory (ROM) 453, a secure random access memory (RAM) 455, a plurality of non-volatile memory registers 460. In an embodiment, the non-volatile memory registers are implemented using fuse cells that can be fabricated using standard CMOS processes. The non-volatile memory registers are programmed (burned or blown) during the silicon manufacturing process to store information such as the device ID, the root public key, and others. Integrated secure element 450 also includes multiple hardware accelerators 456 that can be one or more crypto processors as described above in association with crypto hardware 356 of FIG. 3.

In order to minimize cost, the CA software code is stored in the secure RAM 455 according to an embodiment of the present invention. The CA software is dynamically downloaded from the remote (external) flash memory 480 to the RAM 455 ("RAM-ware") during the power cycle of the integrated secure element 450. Because the CA software is downloaded from the external Flash memory, it must be first authenticated by the integrated secure element 450. In an embodiment, the secure element operates a protocol to authenticate the RAM-ware using a public key algorithm and a digital certificate that is provided during the manufacturing of the demodulator SOC. In an embodiment, the authentication process can be assisted and accelerated using the hardware accelerators 456.

In an embodiment, CA software is received by the demodulator logic from the external memory and transferred to the secure RAM 455 via a demodulator interface circuit 466. In contrast to conventional secure elements that store the CA software code in EEPROM and/or Flash memory, embodiments of the present invention provides a RAM-ware architecture that can be updated easily and securely (e.g., by reading in software codes stored in external memories). Because the RAM-ware architecture does not require EEPROM and/or Flash memory, it can be cost effectively produced using standard CMOS processes.

In an embodiment, the integrated secure element produces an attribute based on a digital certificate contained in the received software (now RAM-ware because it is now stored in the secure RAM) and provides the attribute to the demodulator logic for descrambling the received data streams (not shown). In some embodiments, the attribute can be a secure bit pattern or a secure codeword to enable the descrambling process in the demodulator logic 410.

In an embodiment, the integrated secure element 450 is activated when the TV application is enabled by the user. When the TV application is enabled, the demodulator logic causes the boot ROM to execute the boot instructions and activate the integrated secure element. During the boot process, the conditional access (CA) firmware stored in the external flash memory is downloaded to the RAM disposed in the secure element, so that the CPU starts operating.

As described above, the remote Flash memory contains conditional access (CA) software or code that is dynamically loaded to the RAM 455 disposed in the integrated secure element. In an embodiment, the external memory contains a digital certificate that is generated by the CA vendor or the demodulator SOC device manufacturer and signed with the root private key or a derivative of the root key using public key infrastructure (PKI). In an embodiment, the digital certificate may be unique to each demodulator SOC device and contains a device identification (ID) code. In an embodiment, the same identification code is also stored in one or more of the non-volatile registers 460. In an embodiment, the non-volatile registers 460 may also store a digital signature of the CA software or CA firmware. In an embodiment, the boot ROM authenticates the firmware using the digital certificate.

In an embodiment, the secure boot ROM may process the digital certificate as follows: (i) verify that the certificate is authentic and the certificate has been signed by a trusted delegate of the root key owner; (ii) verify that the certificate is intended for the given device by comparing the device ID stored in the secure element NVM (non-volatile memory) registers and the code stored in the certificate to ensure that they match; and (iii) authenticate the firmware by regenerating its signature with the root public key and comparing the result with the value stored in the certificate. Only when the above three steps are successful, the SW that has been downloaded to the secure element RAM is verified and considered to be trustworthy. In embodiment, the SW code in the external memory may be encrypted. In this case it is first deciphered by the boot ROM. The SW encryption key (or a derivative) is stored in the secure element NVM registers and used directly by the ROM code.

The invention is not limited to a specific type of digital broadcast signals as the multiple hardware accelerators can assist CPU to process a specific type of digital signal. The CPU may include suitable logic, circuitry and program code for performing conditional access operations. In an embodiment, the CPU may be configured to process a specific conditional access to a service provider. The random access memory may store new conditional access operations that are either specific to a service provider or content owner. In an embodiment, the boot ROM may load and store code and data to perform conditional access operations. In an embodiment, the non-volatile memory registers include one or more fuse banks or fuse registers to store information for authentication and device specific identification (ID).

Many alternatives, modifications, and variations will be apparent to those skilled in the art in light of the above teachings. For example, although embodiments of the present invention are described in relation to a handheld receiver device for digital TV, they can also be applied to portable receivers such as laptop computers, notebooks, tablets and other mobile devices such as car receivers for receiving digital audio broadcastings or other controlled broadcasting standards. Embodiments of the present invention can also apply to networked devices.

It is understood that the above embodiments of the present invention are illustrative and not limitative. Various alternatives and equivalents are possible. The invention is not limited by the type of integrated circuits in which the present disclosure may be disposed. Other additions, subtractions or modifications are obvious in view of the present invention and are intended to fall within the scope of the appended claims.

What is claimed is:

1. An integrated circuit adapted to receive data, the integrated circuit comprising:
   a demodulator adapted to demodulate the received data; and
   a hardware unit adapted to enable conditional access to the demodulated data, the hardware unit comprising:
      a processing unit;
      a random access memory;
      a read-only access memory;
      a plurality of non-volatile registers or fuses;
      one or more hardware accelerators; and
      an interface unit adapted to receive a conditional access program code from an external memory and store the program code in the random access memory during a power-up cycle,
   wherein the read-only memory comprises a boot code causing the integrated circuit to authenticate the program code prior to storing the program code in the random access memory, and
   wherein the one or more hardware accelerators are configured to assist the program code authentication.

2. The integrated circuit of claim 1, wherein at least one of the plurality of non-volatile registers or fuses comprises an identification code of the integrated circuit.

3. The integrated circuit of claim 1, wherein at least one of the plurality of non-volatile registers or fuses comprises an encryption key.

4. The integrated circuit of claim 1, wherein the program code comprises a certificate that is authenticated by the hardware unit using information stored in the plurality of non-volatile registers or fuse banks.

5. The integrated circuit of claim 1, wherein the program code is encrypted.

6. The integrated circuit of claim 5, wherein the read-only memory deciphers the encrypted fetched conditional access code using a key stored in the plurality of non-volatile registers or fuses.

7. The integrated circuit of claim 4 further comprising a descrambler adapted to descramble the demodulated information data in response to an attribute that is generated based on the certificate.

8. The integrated circuit of claim 1 further comprising a crypto processor configured to provide tamper resistance to the integrated circuit.

9. A device for use in a conditional access system, the device comprising:
   a receiver module for receiving encrypted information data; and
   a hardware unit adapted to grant conditional access to the received information data, the hardware unit comprising:
      a processing unit;
      a random access memory coupled to the processing unit;
      a read-only access memory coupled to the processing unit;
      a plurality of non-volatile registers or fuses;
      one or more hardware accelerators; and
      an interface unit adapted to transfer an attribute to the receiver module,
   wherein the device is adapted to download a program code from an external memory and store the program code in the random access memory during a power-up cycle,
   wherein the read-only memory comprises a boot code causing the device to authenticate the program code prior to storing the program code in the random access memory, and
   wherein the one or more hardware accelerators are configured to assist the program code authentication.

10. The device of claim 9, wherein the receiver module and the hardware unit are integrated together in a single CMOS integrated circuit.

11. The device of claim 9, wherein the receiver module decrypts the received information data using the attribute.

12. The device of claim 9 further comprising a memory interface port adapted to receive an external memory.

13. The device of claim 12, wherein the receiver module receives a conditional access code from the external memory and transfers the access code to the random access memory disposed in the hardware unit.

14. The device of claim 9 further comprising a crypto processor configured to provide tamper resistance to the device.

15. The device of claim 9, wherein the boot code causes the processing unit to fetch a conditional access code from an external memory.

16. The device of claim 15, the fetched conditional access code is encrypted and deciphered by the processing unit disposed in the hardware unit.

17. The device of claim 15, the fetched conditional access code is stored in the random access memory.

18. The device of claim 15, the fetched conditional access code comprises a certificate that is authenticated by the hardware unit using information stored in the plurality of non-volatile registers or fuses.

19. The device of claim 18, wherein the information stored in the plurality of non-volatile registers or fuses comprises an identity code of the device and a certificate key.

20. The device of claim 9, wherein the receiver module comprises a descrambler circuit adapted to decrypt the received information data using the attribute.

21. The device of claim 9, wherein the received information data comprises broadcast digital radio or digital television content.

\* \* \* \* \*